Figure 1:
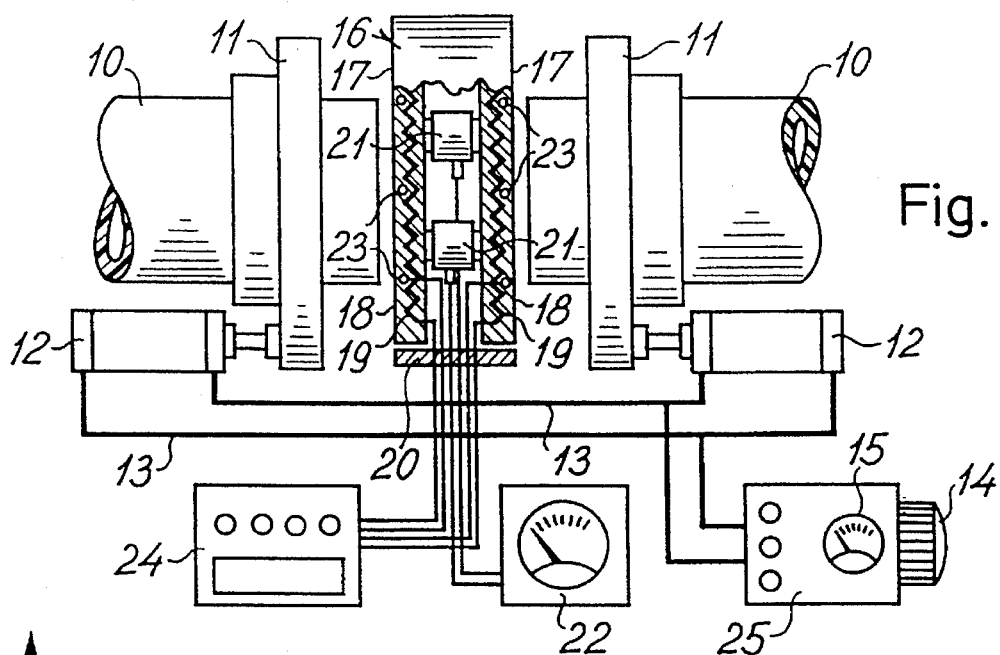

United States Patent [19]
Brath

[11] Patent Number: 5,527,406
[45] Date of Patent: Jun. 18, 1996

[54] METHOD, A HEATING DEVICE AND AN APPARATUS FOR FUSING SEPARATE THERMOPLASTIC BODIES

[75] Inventor: Lars E. Brath, Viborg, Denmark

[73] Assignee: Brath ApS, Denmark

[21] Appl. No.: 66,091

[22] PCT Filed: Sep. 20, 1991

[86] PCT No.: PCT/DK91/00283

§ 371 Date: Jul. 6, 1993

§ 102(e) Date: Jul. 6, 1993

[87] PCT Pub. No.: WO92/09419

PCT Pub. Date: Jun. 11, 1992

[30] Foreign Application Priority Data

Nov. 29, 1990 [DK] Denmark .................. 2847/90

[51] Int. Cl.⁶ ........................................... B29C 65/20
[52] U.S. Cl. ........................ 156/64; 156/304.2; 156/358; 156/378; 156/499; 156/503
[58] Field of Search ........................ 156/64, 158, 294, 156/304.2, 499, 503, 358, 378; 219/221, 243, 535; 73/862.541, 862.542, 855

[56] References Cited

U.S. PATENT DOCUMENTS

| | | | |
|---|---|---|---|
| 3,013,925 | 12/1961 | Larsen | 156/503 |
| 3,372,577 | 3/1968 | Bates et al. | 73/855 |
| 4,263,084 | 4/1981 | Takala . | |
| 4,640,732 | 2/1987 | Stafford | 156/503 |
| 4,957,570 | 9/1990 | Jenkins et al. . | |
| 4,974,454 | 12/1990 | Wolfer et al. | 73/862.541 |
| 5,013,376 | 5/1991 | McElroy et al. | 156/499 |
| 5,051,148 | 9/1991 | Resch | 156/499 |

FOREIGN PATENT DOCUMENTS

| | | | |
|---|---|---|---|
| 0196795 | 10/1986 | European Pat. Off. . | |
| 0256825 | 2/1988 | European Pat. Off. . | |
| 0329350 | 8/1989 | European Pat. Off. . | |
| 2308078 | 8/1974 | Germany . | |
| 38024 | 3/1984 | Japan | 156/358 |
| 10436 | 1/1986 | Japan | 156/358 |
| 202556 | 9/1967 | U.S.S.R. | 73/862.541 |
| 1260234 | 5/1985 | U.S.S.R. . | |
| 1229066 | 5/1986 | U.S.S.R. | 156/378 |
| 2105806 | 3/1983 | United Kingdom | 156/378 |

*Primary Examiner*—Steven D. Maki
*Attorney, Agent, or Firm*—Browning, Bushman, Anderson & Brookhart

[57] ABSTRACT

A method and apparatus for fusing adjacent surfaces of a pair of separate bodies made from thermoplastic, fusible material in which a heating device having a pair of mutually moveable parts is employed, each moveable part defining a heating surface that may be heated by heating means, there being pressure sensing means arranged between the mutually moveable parts of the heating device whereby the so-called bead-up pressure may be measured and controlled independently of the varying drag pressure, the heating device being arranged between opposite ends of the bodies or tubes to be fused, the body surfaces being forced into abutting engagement with the heated opposite surfaces of the heating device, the heating device being removed from the heated surfaces of the bodies when the heated bodies are heated to the desire degree, the heated bodies then being forced into mutual engagement to cause fusion of the bodies to one another.

12 Claims, 2 Drawing Sheets

METHOD, A HEATING DEVICE AND AN APPARATUS FOR FUSING SEPARATE THERMOPLASTIC BODIES

The present invention relates to a method of fusing adjacent surfaces of a pair of separate bodies made from thermoplastic, fusible material.

European patent application No. 0 196 795 discloses an apparatus for fusion joining of thermoplastic pipes. This known apparatus comprises a pair oppositely arranged clamps which are moveable in relation to a frame towards and away from each other by means of hydraulic cylinders or rams. The free ends of a pair of thermoplastic pipes for natural gas distribution are mounted in the respective clamps so that the end surfaces of the pipes may be moved into engagement with opposite surfaces of a heater plate arranged therebetween by means of the rams. The hydraulic pressure in the rams is increased to a certain pressure level (drag pressure) at which the clamps and the pipe ends clamped thereby start moving towards the heater plate. Such movement is detected by a limit switch, and a microprocessor-based control system adds a pre-programmed value of pressure (bead-up pressure) to the drag pressure so that the pipe ends are forced against the opposite surfaces of the heater plate to form end beads thereon. While the drag pressure is mainly the pressure necessary to overcome frictional forces acting on the pipes, the clamps and other moveable parts connected thereto, the bead-up pressure is the pressure determining the surface pressure obtained between the heater plate at the pipe end surfaces.

After heating for a pre-programmed period the control system automatically initiates reduction of the hydraulic pressure and retraction of the heater plate. Immediately thereafter the heated thermoplastic pipe ends are forced together (fusion) for another programmed period of time, and the hydraulic pressure applied is the sum of the recorded drag pressure and a pre-programmed added pressure (fusion pressure), the pre-programmed fusion pressure being chosen so as to correspond to the desired pressure per unit of area of the pipe end surfaces during fusion.

In order to secure that the fusion joint is without any defects and that substantially the same quality of the fusion joints (for example in accordance with certain standards or regulations) is obtained by a number of successive uniform fusion operations, it is important that the bead-up pressure and the fusion pressure do not vary to any appreciable extent from time to time and that said pressures are kept at the prescribed values. In using the known apparatus described above the drag pressure being measured is the hydraulic pressure necessary to cause movement of the clamp and of the pipe or tube gripped thereby. This means that the friction to be overcome is the resting friction and not the sliding friction which is lower. Consequently, the actual pressure applied to the end surfaces of the pipe or tube ends during the bead-up and fusion procedures are not exactly the pre-programmed pressures added to the drag pressure, when the known apparatus is used.

The present invention provides a method of fusing adjacent surfaces of a pair of separate bodies, such as solid rod-shaped bodies or tubular bodies, made from thermoplastic, fusible material. The method according to the invention comprises forcing the surfaces of the bodies into abutting engagement with respective opposite surfaces of a heating device, heating the opposite surfaces of the heating device to a predetermined temperature at least equal to the temperature of fusion of the thermoplastic material, maintaining the thermoplastic bodies into contact with the heated opposite surfaces of the heating device for a predetermined period of time so as to heat the abutting surfaces of the bodies to a temperature at least equal to the temperature of fusion of the thermoplastic material, removing the heating device from the heated surfaces of the bodies, and forcing the heated surfaces of the thermoplastic bodies into mutual engagement so as to fuse said bodies, and the method according to the invention is characterized in measuring the pressure between said body surfaces by arranging pressure sensing means therebetween, and in controlling the forcing of the body surfaces into abutting engagement with the opposite surfaces of the heating device so as to substantially maintain the measured pressure at a predetermined value for a predetermined period of time. By directly measuring the pressure applied to the opposite body surfaces and controlling such pressure it is possible to directly and accurately measure and control the bead-up pressure independently of the varying drag pressure.

It is possible to arrange the pressure sensing means between the body surfaces and to force these surfaces towards each other prior to heating them. By comparing the pressure sensed by the sensing means arranged between the body surfaces and the pressure forces applied to the bodies, the actual drag pressure may be accurately calculated. When the surfaces of the bodies are subsequently forces into abutting engagement with the opposite surfaces of the heating device, the abutment pressure may be accurately determined and controlled, for example by means of a microprocessor, based on the information obtained about the actual drag pressure.

However, the pressure sensing means are preferably arranged between a pair of mutually moveable parts of the heating device, each part defining one of said opposite surfaces of the heating device. It is then possible directly to measure the pressure between the body surfaces and the heated surfaces of the heating device during the heating process and to currently control such pressure.

After the bead-up procedure the heating device is removed, and the heated body surfaces are forced into mutual engagement to cause fusion thereof. Because the drag pressure may be considered substantially the same as during the immediately preceding bead-up procedure, the total pressure applied during the bead-up procedure may be reduced or increased by a predetermined amount corresponding to the value by which the fusion pressure should be reduced or increased in relation to the bead-up pressure. Preferably, however, the heated body surfaces are forced into mutual engagement at a second pressure substantially of the same value as a first pressure at which the body surfaces are forced into abutting engagement with the heated surfaces of the heating device during the bead-up procedure.

The thermoplastic bodies to be fused may be solid or hollow and may be of any shape, for example rod-shaped. However, the method according to the invention is especially useful for fusing complementary end surfaces of tubular bodies or pipes, such as natural gas distribution pipes of thermoplastic material.

In principle, the bodies to be fused may be forced into engagement with the heating device and into mutual engagement in any suitable manner. Preferably, the bodies to be fused are mounted on respective supporting members, which are mutually moveable along a track, the body surfaces being forced into abutting engagement with the opposite end surfaces of the heating device and into mutual engagement by pressure fluid actuated driving means forcing the supporting members towards each other along said track, the pressure of the pressure fluid supplied to the driving means being controlled so as to obtain the predetermined value of the measured pressure between the moveable parts of the heating device. The pressure fluid actuated driving means may comprise expandable devices, such as pneumatic and hydraulic cylinders or rams.

As indicated above, the pressure of the pressure fluid supplied to the driving means for forcing the heated body surfaces into mutual engagement may be related to the pressure of the pressure fluid supplied for forcing the body surfaces into abutting engagement with the opposite surfaces of the heating device. Thus, the pressure of the pressure fluid supplied during the fusion procedure may be determined by increasing or decreasing the pressure of the pressure fluid supplied during the bead-up procedure by a predetermined value. Preferably, however, the two pressures are identical or substantially of the same value. The pressure of the pressure fluid supplied so as to force the end surfaces of the bodies into engagement with the opposite surfaces of the heating device may be varied during the bead-up procedure. Preferably, the body surfaces are forced into abutting engagement with the heated surfaces of the heating device at a first pressure for a predetermined first period of time and subsequently the pressure is reduced to a second pressure, which is maintained for a second period of time. The heated body surfaces may then be forced into mutual engagement at a pressure substantially equal to said first pressure.

The present invention also provides a heating device for use in fusing adjacent surfaces of a pair of separate bodies made from thermoplastic, fusible material and defining a pair of opposite heating surfaces, and the heating device according to the invention is characterized in comprising a pair of mutually moveable parts each defining one of said heating surfaces, and pressure sensing means arranged between said moveable parts for sensing the pressure applied to said opposite surfaces.

The pressure sensing means may, for example, comprise a compressible fluid container or fluid chamber, such as one or more hydraulic cylinders arranged between the moveable parts of the heating device and i pressure detector for detecting the pressure within the fluid container or containers. In the preferred embodiment, however, the pressure sensing means comprise a pressure transducer, such as a strain gauge based bending member or a weighing cell.

The heating device may further comprise electrical heating means for heating the heating surfaces and temperature sensing means for controlling the power supply to the heating means so as to substantially maintain the temperature of the heating surface at a predetermined value.

According to a further aspect the present invention provides an apparatus for fusing adjacent surfaces of a pair of separate bodies made from thermoplastic, fusible material, said apparatus comprising a frame, a pair of supporting members for supporting the bodies to be fused and being mutually moveable along a track defined by the frame so as to move said surfaces of the bodies into and out of engagement, pressure fluid actuated driving means for forcing the supporting members towards each other along said track, and a heating device defining a pair of opposite heating surfaces to be engaged with the body surfaces to be fused and comprising heating means for heating the heating surfaces to a predetermined temperature, and the apparatus according to the invention is characterized in that the heating device comprises a pair of mutually moveable parts each defining one of said heating surfaces, and pressure sensing means arranged between said moveable parts for sensing the pressure applied to the opposite heating surfaces of the heating device.

The apparatus may further comprise an electronic control system, such as a microprocessor, for controlling the pressure of the fluid supplied to the driving means in response to sensing signals received from the pressure sensing means. The control system or microprocessor may also be adapted to control the temperature of the heating surfaces of the heating device in timed relationship to the control of pressure in accordance with a predetermined program.

Figure 2:
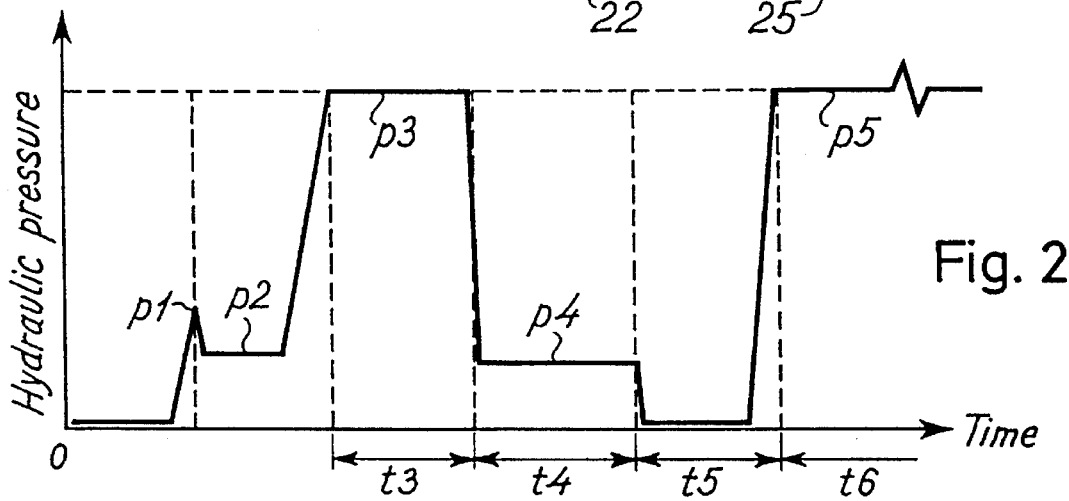
Figure 3:
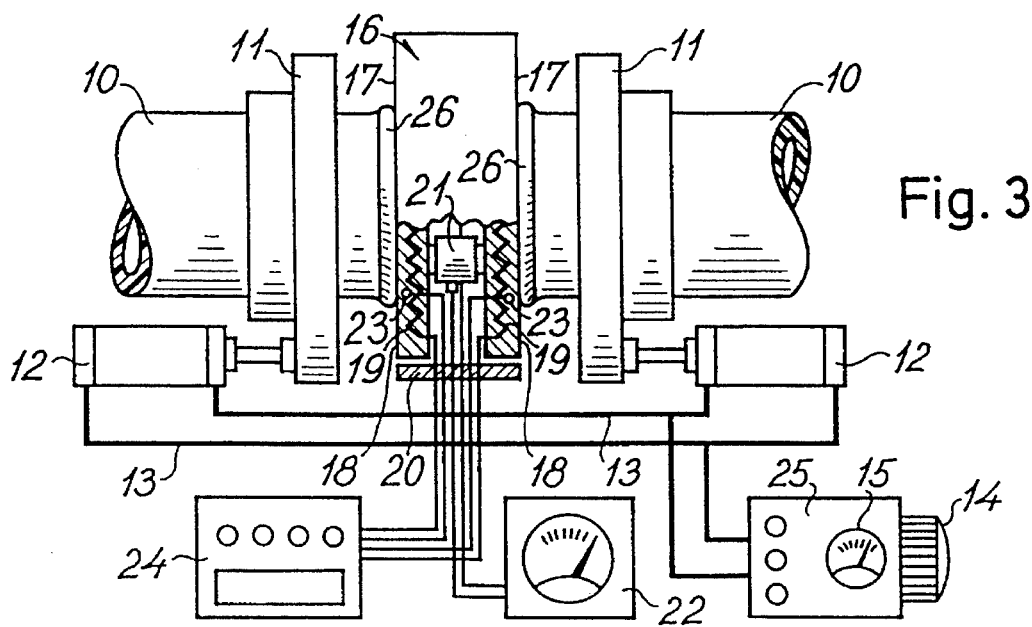
Figure 4:
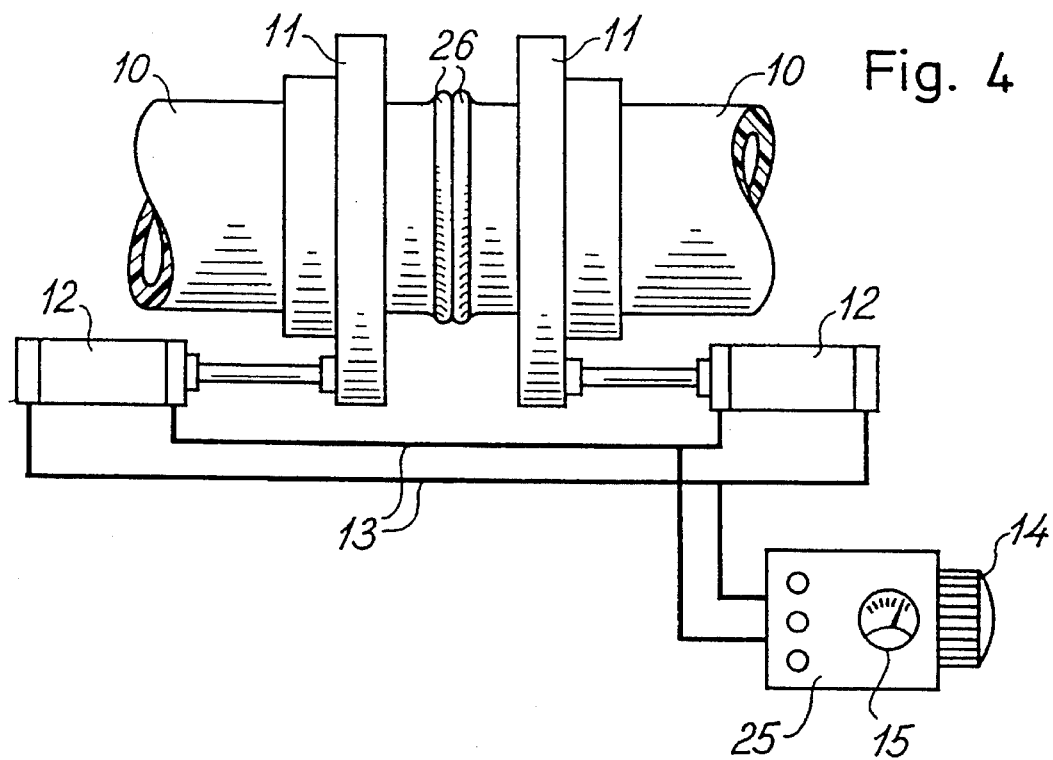
Figure 5:
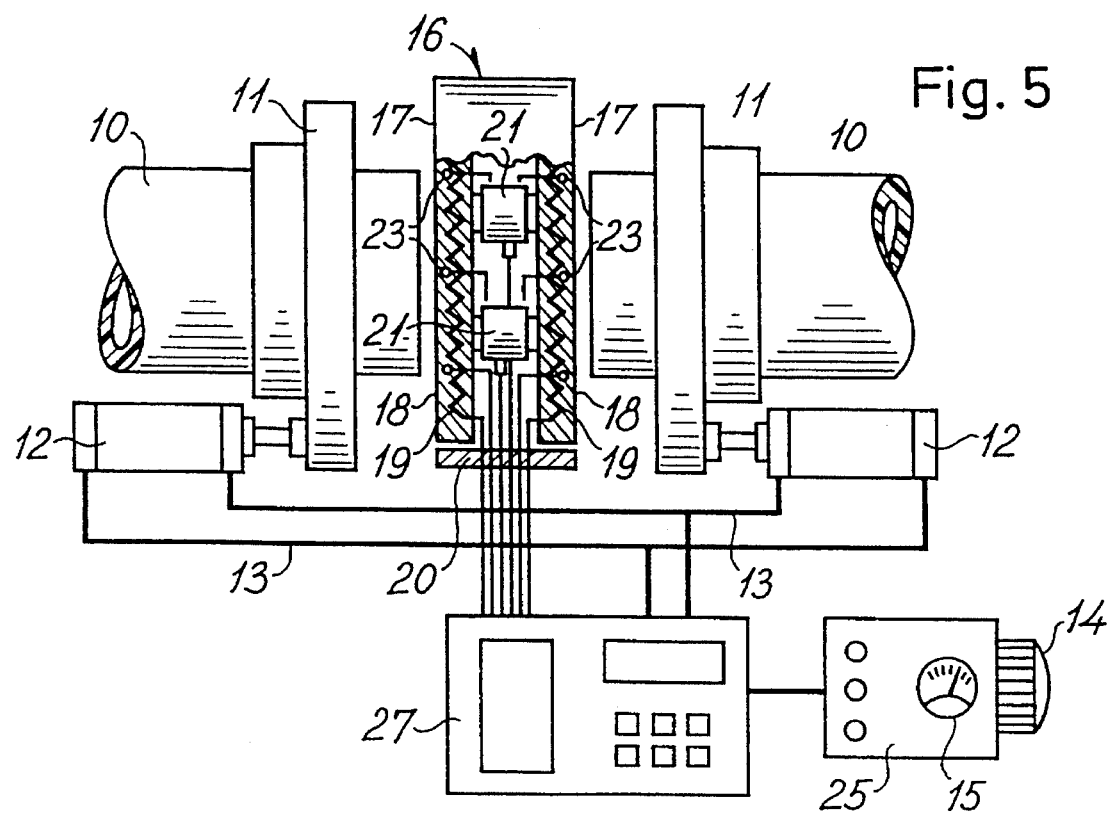

The invention will now be further described with reference to the drawings, wherein FIG. 1 is a diagrammatical view of part of an embodiment of the apparatus according to the invention, FIG. 2 is a schematic simplified diagram showing changes in hydraulic pressure in the cylinders or rams shown in FIG. 1 plotted against time during a complete cycle of operation of the apparatus shown in FIG. 1, FIG. 3 shows the apparatus part of FIG. 1 during the bead-up operation, FIG. 4 shows the apparatus of FIGS. 1 and 3 during fusion operation, and FIG. 5 diagrammatically shows part of a modified embodiment of the apparatus according to the invention.

In the apparatuses shown in FIGS. 1 and 3–5 tube or pipe sections 10 which may, for example, form part of a natural gas distribution pipe, are releasably held or clamped by means of clamping or gripping devices 11, which are moveable along a crack defined by an apparatus frame (not show). The clamping or gripping devices 11 may be moved along the track towards and away from each other by means of double-acting hydraulic cylinders or rams 12. Hydraulic fluid may be supplied to the double-acting cylinders 12 through conduits 13 in a hydraulic system including an hydraulic pump 14 and a pressure gauge or manometer 15 for indicating the hydraulic pressure in the hydraulic system.

The apparatus also comprises a heater plate 16 having a pair of oppositely directed outer heating surfaces 17, which are formed on a pair of heater discs 18 each of which may contain or support an electrical heating element 19 for heating the heating surfaces. The heater discs 18 may be guided by an outer, peripheral frame member, so that the heater discs 18 are axially moveable in relation to each other. It should be understood that one of the heater discs 18 could be fastened to the frame member 20 while the other is moveable in relation thereto, or both of the heater discs 18 may be moveable in relation to the frame member 20. Force or pressure sensing means 21, for example force or pressure transducers, such as hydraulic cylinders or weighing cells, are arranged between the heater discs 18 so that axial forces applied to the oppositely directed heating surfaces 17 are sensed or detected by the force sensing means 21.

The pressure sensing means 21 generate electrical signals or pressure signals in response to the force applied thereto, and these measuring signals may be transmitted to an instrument 22 visually indicating the axial forces applied to the oppositely directed heating surfaces 17 (FIGS. 1 and 3). Temperature sensors 23 may be arranged in the heater discs 18 adjacent to the heating surfaces 17, and power supplied to the electrical heating elements 19 may be controlled by means of an electrical control device 24 in response to signals received from the temperature sensors 23 so that the temperature of the heating surfaces 17 is maintained at a desired value set by means of the control device 24.

The apparatus described above may be operated as follows:

When the tube or pipe sections 10 to be fused have been mounted in the clamping or gripping devices 11 the heater plate 16 is arranged between the axially spaced end surfaces of the axially aligned tube sections 10, and the desired temperature of the heater plate 16 is set by means of the control device 24. When the control device 24 indicates that the desired temperature of the oppositely directed heating surfaces 17 of the heater plate 16 has been reached, the hydraulic pump 14, which may be driven manually or by an electric motor, is operated. The hydraulic pressure supplied to the hydraulic cylinders 12 through the conduits 13 is gradually increased and controlled by means of a control device 25 including the pressure gauge 15 and possibly also a servo valve controlled by the control device. Thereby, the end surfaces of the tube or pipe sections 10 are pressed into engagement with the heating 22 surfaces 17 of the heater plate 16. When the instrument indicates that the desired, predetermined force or pressure corresponding to the desired pressure per surface unit has been reached, the pressure indication (bead-up pressure) of the pressure gauge or manometer 15 is read by the operator or automatically stored in a memory of the control device, and the pressure of the hydraulic system is maintained at the read pressure value for a predetermined period of time (bead-up time) in which the thermoplastic material of the opposite end portions of the tube sections 10 are heated to a temperature above fusion temperature whereby a bead 26 is formed at each tube section end as shown in FIG. 3. When the predetermined bead-up time period has lapsed, the hydraulic pressure in the hydraulic system is reduced to atmospheric pressure and the heater plate 16 is removed 10. from its position between the tube or pipe sections Now, the pressure of the hydraulic system is increased preferably until the manometer 15 indicates a hydraulic pressure corresponding to the pressure previously stored in the memory of the control device or read by the operator during the bead-up operation. It should be understood, however, that this reading could be increased or reduced by adding a predetermined value thereto or deducting a predetermined value therefrom. Such increase of pressure in the hydraulic system causes the hydraulic cylinders 12 to press the heated, thermoplastic end portions of the tube or pipe sections 10 into mutual engagement at a predetermined force or pressure (fusion pressure) as shown in FIG. 4, and this fusion pressure may be maintained for a predetermined period of time until the beaded ends portions of the tube or pipe sections 10 have become fused and cooled to a temperature well below fusion temperature. The manometer 15 may be provided with means, such as an extra indicator, for indicating the maximum pressure of the hydraulic system reached during the heating or bead-up procedure. These indicator means may then indicate the pressure which should also be reached during fusion of the tube sections 10.

FIG. 2 shows a typical complete cycle of hydraulic pressure variation during the bead-up and fusion procedures. As shown in FIG. 2 the pressure is increased from zero to a pressure p1 at which movement of the clamping devices 11 and the tube sections 10 are initiated. Thereafter, the hydraulic pressure in the system decreases a certain amount to a pressure p2 being the drag pressure mainly determined by the sliding friction to be overcome in order to move the tube or pipe sections 10 towards each other. When the end surfaces of the tube or pipe sections 10 come into engagement with the oppositely directed heating surfaces 17, the hydraulic pressure will increase to a predetermined maximum value p3 being the sum of the drag pressure and the bead-up pressure, and the pressure p3 may be maintained for a predetermined period of time t3. Thereafter, the pressure may be decreased to a substantially lower pressure p4 which is maintained for a period of time t4 (leak heating) during which the tube ends are still forced into engagement with the heater plate 16, but at a reduced pressure. When the time period t4 has expired heating and bead-up of the tube ends have been terminated and the pressure of the hydraulic system is reduced to zero and the tube ends are moved out of engagement with the heater plate 16 so that the heater plate may be removed from the spacing between the tube ends. After removal of the heater plate 16 the pressure in the hydraulic system is again increased to a value p5 so that the heated and beaded ends of the tube or pipe sections 10 are pressed into mutual engagement. In FIG. 2 the time period or conversion time in which the heater plate is removed and the tube ends are moved into mutual engagement is designated t5. The pressure p5 of the hydraulic system during the fusion and cooling period t6 may be the same as the p3 as indicated in FIG. 2. However, the pressure p5 may deviate from the pressure p3, if desired.

FIG. 5 shows a modified embodiment of the apparatus illustrated in FIGS. 1, 3 and 4. In FIG. 5 the power supply to the heating elements 19 and the operation of the hydraulic pump 14 and, consequently, the pressure of the hydraulic system is controlled in response to signals received from the pressure sensing members 21 and the temperature sensors 23 by means of a control device, such as a microprocessor 27 based on a predetermined program. Thus, such program may contain information about bead-up pressure and time, leak-heating pressure and time, conversion time, fusion pressure and the time period for fusion and cooling etc. The operation of the apparatus may then be automatically controlled by the microprocessor so that a uniform fusion result is obtained from time to time.

It should be understood that in the method and apparatus according to the invention the actual bead-up pressure may be measured directly by means of the force or pressure sensing means 21, which are arranged between mutually moveable parts of the heater plate 16, so that the total bead-up force or a known fraction thereof is taken up by the sensing means. The hydraulic pressure necessary for obtaining the directly measured bead-up pressure is then used for reference when determining the hydraulic pressure to be used for forcing the tube or pipe sections 10 into mutual engagement during fusion.

While the invention has primarily been described in connection with the fusion of tubes or pipes it should be understood that the invention could also be used for fusing end surfaces of solid rod-like members, channel-like members and members having any other cross-sectional shape.

I claim:

1. An apparatus for fusing adjacent end surfaces of a pair of separate, tubular bodies made from thermoplastic, fusible material, said apparatus comprising a frame, a pair of supporting members for supporting the tubular bodies to be fused and being mutually moveable along a track defined by the frame so as to move said end surfaces of the tubular bodies into and out of engagement, pressure fluid actuated driving means for forcing the supporting members towards each other along said track, and a heating device defining a pair of opposite heating surfaces to be engaged with the body end surfaces to be fused and comprising heating means for heating the heating surfaces to a predetermined temperature, the heating device comprising a pair of mutually moveable parts each defining one of said heating surfaces, and pressure sensing means arranged between said moveable parts for sensing the pressure applied to the opposite heating surfaces of the heating device.

2. An apparatus according to claim 1, further comprising an electronic control system for controlling the pressure of the fluid supplied to the driving means in response to sensing signals received from the pressure sensing means.

3. An apparatus according to claim 2, wherein the pressure sensing means comprises a pressure transducer.

4. An apparatus according to claim 3, wherein the pressure transducer is a weighing cell.

5. An apparatus according to claim 2, wherein the electronic control system is adapted to control the temperature of the heating surfaces of the heating device in timed relationship to the controlling of pressure in accordance with a predetermined program.

6. A method of fusing adjacent end surfaces of a pair of separate, tubular bodies made from thermoplastic, fusible material, said method comprising:

forcing the end surfaces of the bodies into abutting engagement with respective opposite surfaces of a heating device, heating the opposite surfaces of the heating device to a predetermined temperature at least equal to the temperature of fusion of the thermoplastic material, keeping the thermoplastic bodies in contact with the heated opposite surfaces of the heating device for a predetermined period of time so as to heat the abutting end surfaces of the bodies to a temperature at least equal to the temperature of fusion of the thermoplastic material, measuring the pressure between said body end surfaces by arranging pressure sensing means therebetween, controlling the forcing of the body end surfaces into abutting engagement with the opposite surfaces of the heating device so as to substantially maintain the measured pressure at a predetermined value for a predetermined period of time, removing the heating device from the heated end surfaces of the tubular bodies, and forcing the heated end surfaces of the thermoplastic tubular bodies into mutual engagement so as to fuse said tubular bodies together.

7. A method according to claim 6, wherein the pressure sensing means is arranged between a pair of mutually moveable parts of the heating device, each part defining one of said opposite surfaces of the heating device.

8. A method according to claim 7, wherein the tubular bodies to be fused are mounted on respective supporting members, which are mutually moveable along a track, the body end surfaces being forced into abutting engagement with the opposite heated surfaces of the heating device and into mutual engagement by pressure fluid actuated driving means forcing the supporting members towards each other along said track, the pressure measured by the pressure sensing means being maintained at said predetermined value by controlling the pressure of the pressure fluid supplied to the driving means.

9. A method according to claim 8, wherein the pressure of the pressure fluid supplied to the driving means for forcing the heated body end surfaces into mutual engagement is maintained at substantially the same value as that used for forcing the body end surfaces into abutting engagement with the opposite surfaces of the heating device.

10. A method according to claim 6, wherein the heated body end surfaces are forced into mutual engagement at a pressure being substantially of the same value as the pressure at which the body end surfaces are forced into abutting engagement with the heated surfaces of the heating device.

11. A method according to claim 6, wherein the body end surfaces are forced into abutting engagement with the heated surfaces of the heating device at a first pressure for a predetermined first period of time, said first pressure being subsequently reduced to a second pressure, which is maintained for a second period of time.

12. A method according to claim 11, wherein the heated body surfaces are forced into mutual engagement at a third pressure substantially equal to said first pressure.

* * * * *